United States Patent [19]

Dalmasso

[11] 3,808,679

[45] May 7, 1974

[54] TERMINAL LEADS FOR INTEGRATED CIRCUIT PACKAGE AND METHOD FOR PRODUCING A FRAME OF SAID LEADS

[75] Inventor: Claudio Dalmasso, Ivrea, Italy

[73] Assignee: Ing. C. Olivetti & C., S.p.A., Ivrea, Torino, Italy

[22] Filed: Feb. 14, 1972

[21] Appl. No.: 225,903

[30] Foreign Application Priority Data

Feb. 16, 1971 Italy .................................. 67514/71

[52] U.S. Cl. .................... 29/625, 29/193.5, 29/624, 156/3, 204/15, 204/32

[51] Int. Cl. .......................... C23f 1/02, H05k 3/06

[58] Field of Search ...... 29/624, 625, 626, DIG. 12, 29/DIG. 16, 149.5 PM, 627, 628, 630 A, 630 B, 630 C, 630, 580, 623, 193.5; 117/5.5; 156/2, 4, 6, 7, 8, 11; 96/32; 204/2, 3, 12, 14, 15, 17, 18, 22, 23, 32, 43, 44, 143; 174/68.5

[56] References Cited

UNITED STATES PATENTS

| | | | |
|---|---|---|---|
| 2,912,312 | 11/1959 | Japel | 204/18 R |
| 3,405,224 | 10/1968 | Yawata et al. | 174/52.5 |
| 3,440,027 | 4/1969 | Hugle | 29/627 |
| 3,627,901 | 12/1971 | Happ | 29/193.5 X |

OTHER PUBLICATIONS

"Chemical Machining," Metals Handbook, Vol. 3, ASM, 1967, pp. 240, 241, 245

*Primary Examiner*—Charles W. Lanham
*Assistant Examiner*—Joseph A. Walkowski

[57] ABSTRACT

The invention utilizes specially prepared legs or feet which are attached to an integrated circuit package. The legs function as electrical communication paths for the internal circuits and also function to physically support the package. The legs include a relatively thin portion and a relatively thick portion; the thin portion is bonded to the package. Since this portion is very thin, it can be attached to the package by methods which do not require the use of special soldering additives. Not only does the invention concern the use of thinned-down legs but also the method by which these legs can be obtained. These disclosed methods include chemical etching limited to areas defined by masks and also chemical etching used in conjunction with electrolytic growing.

4 Claims, 8 Drawing Figures

TERMINAL LEADS FOR INTEGRATED CIRCUIT PACKAGE AND METHOD FOR PRODUCING A FRAME OF SAID LEADS

BACKGROUND OF THE INVENTION

1. Field of the Invention

The invention relates to circuit packages and, more particularly, the legs which support these packages. The invention also includes methods of making these support legs.

2. Description of the Prior Art

Containers for circuits, for example semiconductor-type integrated electronic circuits, need terminals which carry, outside the container, the signals which said circuits are to exchange with external circuit networks. These terminals must also function to provide strong mechanical connection to such external circuits.

The external-connection terminals of a container are generally in the form of feet distributed in groups with a constant pitch (i.e., spacing) and carried by the base of the container on which the integrated circuits are mounted. By means of such feet, the mechanical mounting and electrical connection of the container to, for example, a printed circuit board are accomplished; the feet are inserted and soldered in conductive holes present in said board and distributed with the same pitch as the feet; the feet can also be soldered to small conductive squares or platforms distributed on the board with the same pitch as the feet.

In order to properly fix a package to a circuit board, said feet must have a substantial mechanical strength. This strength is obtained in known types of containers by cutting a metal strip to form an interconnection structure and thereafter cementing the metal structure to the ceramic base. The feet for connecting the container will be constituted by the limbs of the metal structure which project from the edges of said plate and which are subjected to subsequent bending. This solution, however, has the serious fault constituted by a metallo-ceramic weld with poor resistance to stresses, as a result of which, bending forces applied to the feet may cause the detachment of the metal circuit from the supporting plate.

In another known type of container, the interconnecting circuit of the ceramic substrate is obtained by the screen printing of conductive material on the ceramic base; in this case, firm adhesion is ensured between the interconnecting circuit and the supporting base, however the connection between the feet and the base itself is less secure and strong because the feet are formed by cutting from a metal strip and must be soldered to the metal of the screen-printed conductors. Since the feet are relatively thick, the soldering to the printed metallization is difficult and requires added materials; further the feet must be bent subsequent to the soldering and this bending, which is carried out in a zone very close to the soldering zone itself, causes stresses and cracks in the soldered joints which reduce the mechanical strength of the connection.

SUMMARY OF THE INVENTION

According to the invention, the feet are made sufficiently thin in the zone where they are soldered to the printed conductors of the base so as to make possible the use of rapid-soldering techniques, for example, thermocompression or electric discharge; this thinness also extends to the bending zone: therefore the bending operation does not cause deterioration of the soldered joints because only a small amount of force is needed to bend the thinned-down portion of the feet.

The invention is realized by constructing the frame of feet by means of a chemical milling from base sheets of metal by a photolithographic process.

The external-connection feet for the circuit packages are constructed of tongues of conductive metal adapted to be soldered at one end to conductive platforms present in said package. The platforms form the widened peripheral portions of the printed conductors which are deposited on the base. The base also supports one or more integrated electronic circuits which are connected to the printed conductors. The zone of said end of each leg is made thinner with respect to the remaining part of the feet so that the soldering of said legs to said platforms without adding materials is made possible and the bending of said feet after the soldering operation is facilitated.

A frame comprising a plurality of feet according to the invention may be constructed by the following process: Starting from a sheet of conductive metal, there are superimposed, on the two sides, two photographic masks reproducing the form of said frame for the purpose of defining the contours for a photoengraving operation carried out by means of chemical attack; one of said masks is constructed so that during the operation of photoengraving, the end zones of said feet are left exposed to chemical attack on one side of said sheet, whereby the operation of chemical attack on said face causes a reduction of the thickness of said zones with respect to the remaining part of the frame.

BRIEF DESCRIPTION OF THE DRAWINGS

This characteristic and other characteristics of the invention will become clear from the following description of a number of preferred embodiments given for the purpose of example and without restriction with reference to the accompanying drawings, in which.

Figure 1:
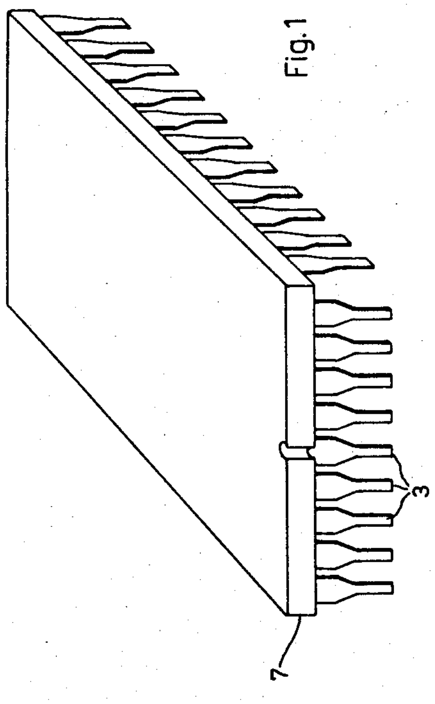
FIG. 1 is a perspective view of a container for integrated circuits comprising external-connection feet according to the invention.
Figure 2:
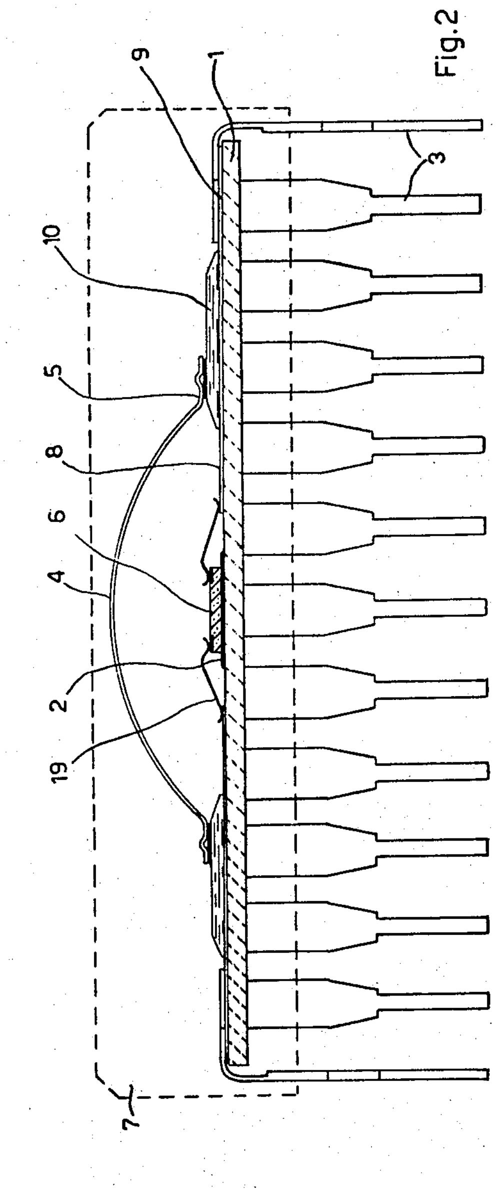
FIG. 2 is a sectional view of an embodiment of the container for integrated circuits of FIG. 1.
Figure 4C:
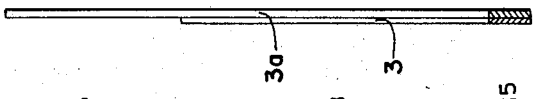
Figure 4B:
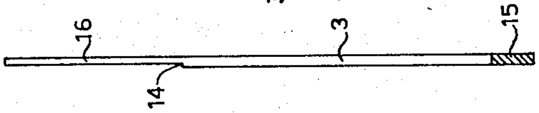
Figure 4A:
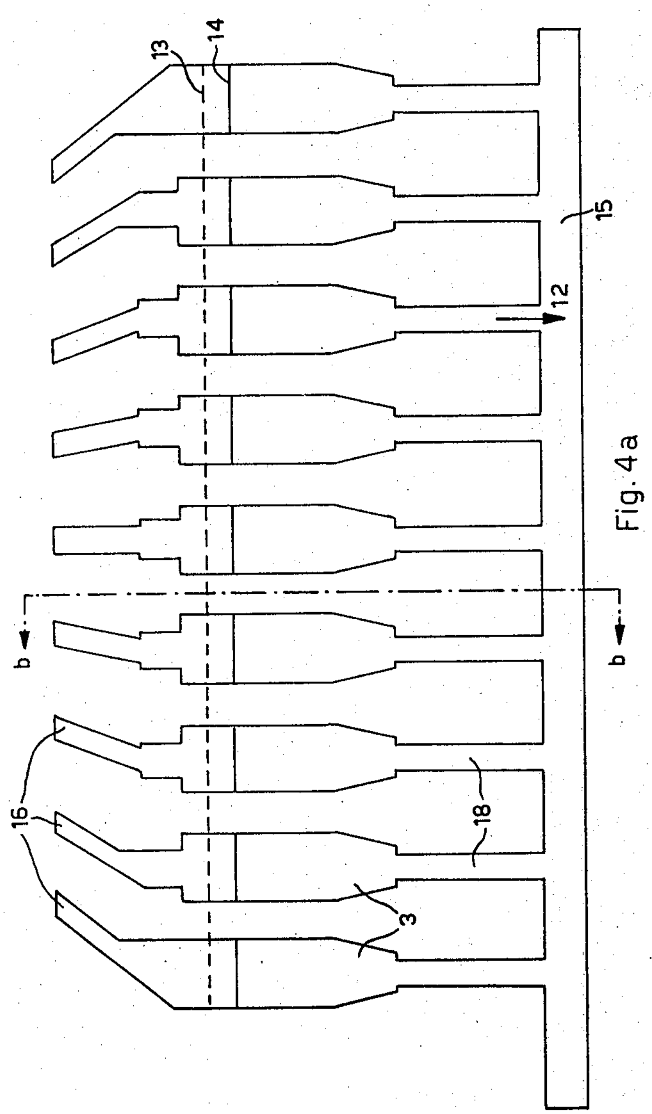

FIG. **4*a* shows a frame of feet according to the invention used in mounting the container illustrated in FIGS. 1 and 2**;

FIG. **4*b* is a sectional view showing one of the feet illustrated in FIG. 4*a***;

FIG. **4*c* is a sectional view of the feet illustrated in FIG. 4*a*** but obtained with other processes according to the invention;

FIGS. **5*a* and 5*b* show respectively two photographic masks used in the chemical attack procedure for the construction of a frame of feet according to the invention as illustrated in FIGS. 4*a* and 4*b***.

DESCRIPTION OF THE PREFERRED EMBODIMENT

There will now be described a container for semiconductor-type integrated circuits in which there are mounted a plurality of external-connection feet according to the invention, for example 40 feet (FIG. 1).

Figure 3:
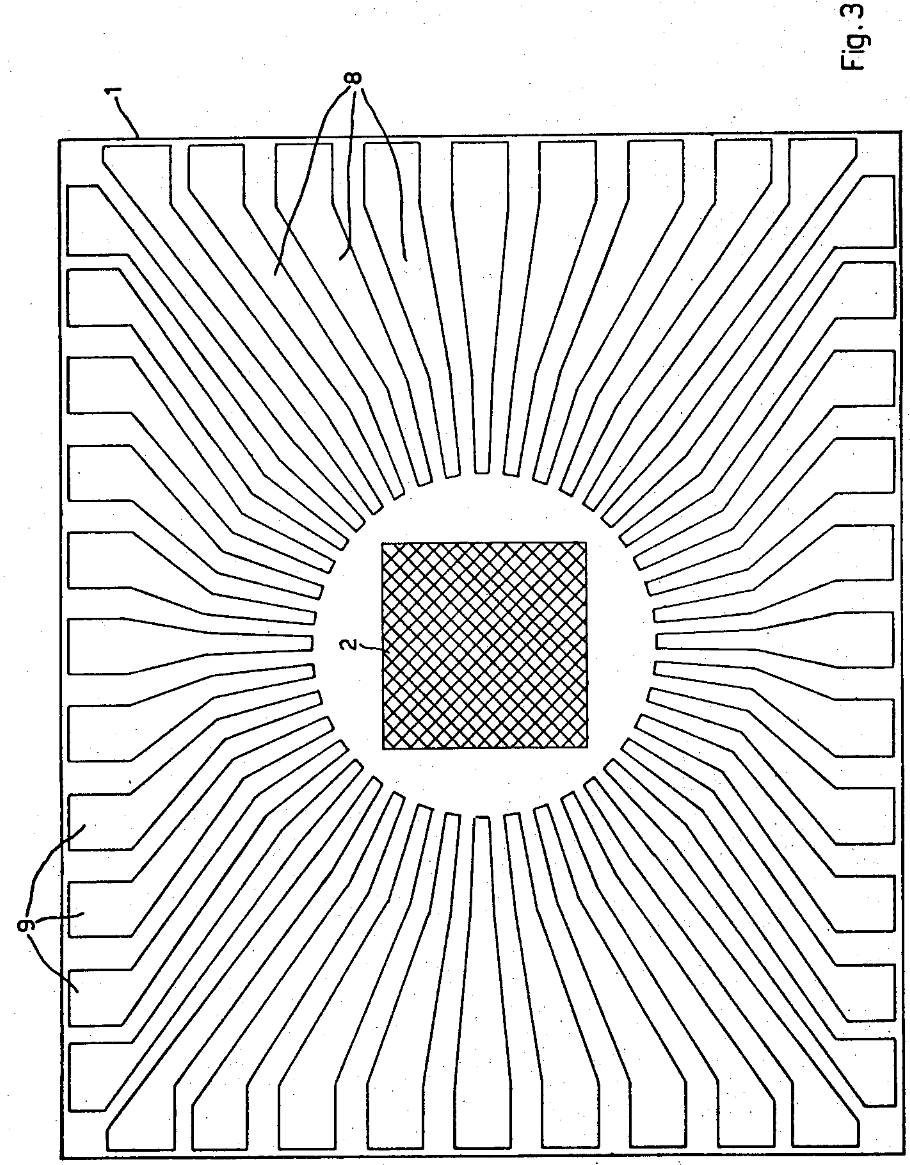
FIG. 3 is a plan view of a base included in the container illustrated in FIG. 2.

The container is composed of the following parts (FIGS. 2 and 3):

a. A ceramic base 1 bearing a series of conductors 8 printed, for example, by a screen-printing process and adapted to produce a series of interconnections between the central part of the base, in which one or more integrated electronic circuit plates 16 are mounted, and the peripheral part, which comprises a series of conductive platforms 9;

b. A set of metal feet 3 (for example Phosphor bronze) which may be tin or gold-plated on at least one surface); the feet are soldered to the conductive platforms 9;

c. A glass frame 10 is obtained by successive screen-printing operations and is superimposed on said printed conductors 8 in the intermediate zone of the base 1 between the peripheral conductive platforms 9 and the central interconnecting ends of said printed conductors 8;

d. One or more pads or bearings 2 printed in the central zone of the base 1 for supporting one or more semiconductor integrated circuit plates 6, the terminals of the plates are connected to the aforesaid central interconnecting ends 8 on the base by means of, for example, soldered wires 19;

e. A protective cover 4 made, for example, of metal and having a flat 5 adapted to be soldered or cemented to said glass frame 10 by various methods;

f. A capsule 7 of plastic material (e.g., silicone or epoxy resin) enveloping all the foregoing elements, with the exception of the free ends of said feet 3, which project from the container for making the connections with external circuits; this capsule is designed to increase the strength of the container and its moisture-tightness; the capsule 7 is especially important in the event that the soldered joint between the cover 4 and the glass frame 10 is not air-tight.

A detailed description of the external-connection feet 3 will now be given.

Each container has four groups of feet, one group per side, by means of which connection between the base on which the integrated circuits are arranged and the printed circuit boards on which the container is to be mounted is effected.

In the type of container illustrated, precise matching of the coefficients of expansion of the material of the feet and that of the base is not required and it is therefore sufficient to employ for the feet a material which presents strong resistance to oxidation and which possesses mechanical and chemical workability.

Referring to FIG. 4*a*, it has been found that optimum results are obtained by using phosphor bronze in strip form, worked so that the direction of bending (shown by dotted line 13) of the feet is perpendicular to the direction 12; direction 12 is the direction in which the metal was rolled.

The described container, which has 40 terminals, requires two different groups of feet, one group comprising two sets of nine feet and, the other two sets of 11 feet (FIG. 1); the sets of nine fit on the short side of the container and the sets of eleven on the long side.

A thickness of, for example, 0.25 mm can be used for the strip from which the feet are to be formed.

The feet according to the invention are thinner in the end zone intended to be soldered to the conductive platforms 9 (FIGS. 2 and 4*b*) so as to permit soldering without the use of added materials and to facilitate the subsequent bending of the feet.

This thinning eliminates deformation and breaks both in the metal of the feet and in the soldered connections during the bending operation, which is normally carried out after the soldering of the feet has been effected. The thin portions of the feet do not cause the package to be weaker than one constructed of ordinary thickness feet because the plastic capsule 7 encases and supports the thin portions.

The feet are prepared in groups, each group constituting a frame obtained by chemical milling from a strip of phosphor bronze through a photolithographic process. The method of constructing a frame of feet according to the invention differs from the known technique which employs the mere cutting of the feet. The cutting process cannot be used to produce connecting feet which can be soldered by high-speed techniques (i.e., those techniques which do not require any added soldering metal and no preliminary operation of coating the feet with soldering metal, for example, by tin-plating).

In fact, the optimum thickness for permitting good soldering of the feet to the conductive platforms of the base by thermocompression is of the order of 50 microns, while the suitable thickness for good rigidity of the feet for the purposes of mounting is at least 0.25 mm.

The reducing of the thickness of the terminal zone of the feet is achieved by leaving one face of said zone exposed during the working of the strip by chemical attack.

Figure 5A:
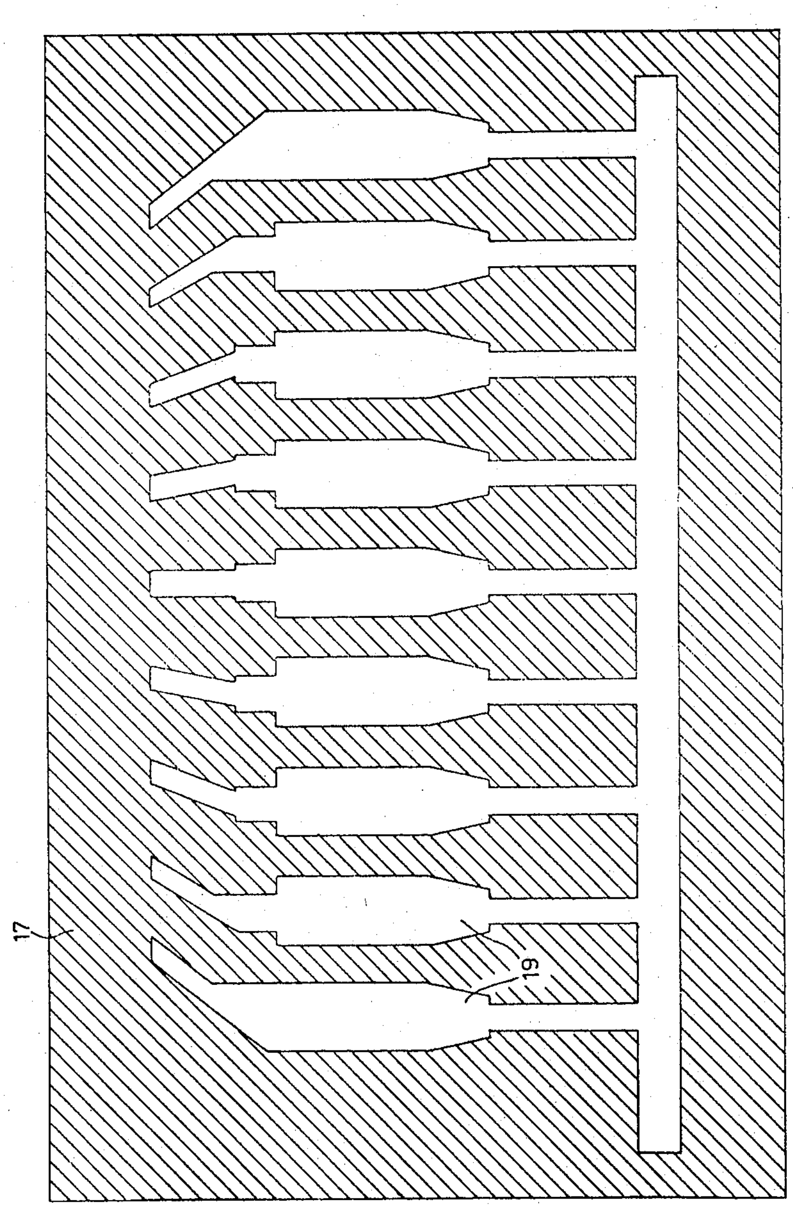
Figure 5B:
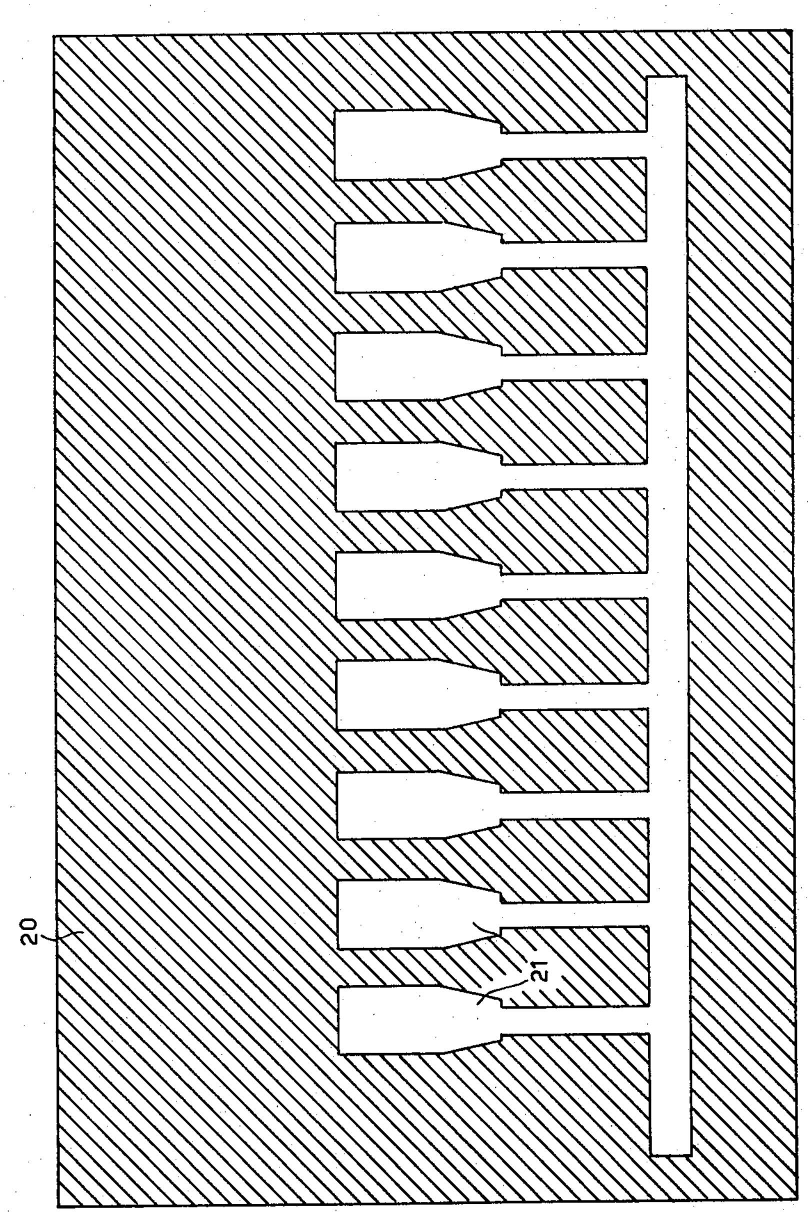

More particularly, a frame comprising a plurality of connecting feet is obtained starting from a strip of conductive metal (e.g., phosphor bronze) on which there are superimposed, on the two faces, two photographic masks (FIGS. 5*a* and 5*b*) reproducing the form of the frame for the purpose of defining the contours thereof by means of a photolithographic operation. A first photographic mask 17 is illustrated in FIG. 5*a* and reproduces the form of a frame of nine feet as shown in FIG. 4*a*. FIG. 5*b* shows a second photographic mask in which the form of the frame of nine feet is only partially reproduced, the zones above line 14 (FIG. 4*a*) being missing; these zones constitute the thinned-portions of the feet, which portions are used for the soldering of the feet to the conductive platforms 9. The shaded portions of the masks in FIGS. 4*a* and 4*b* represent the opaque part of the photographic film while the unshaded portions 19 and 21 represent the parts which transmit the light rays.

The two masks therefore act as photographic negatives of the frame of feet to be milled. Naturally, the superimposition of the two masks on the two opposite faces of the base plate requires mutual centering of the contours of the frames defined by the two masks.

During the operation of photoreproduction of the pattern of the two masks 17 and 20 on the two opposite faces of the base plate of conductive metal, the masks 17 and 20 act as protective guides, in a photolithographic process, for the base-plate portions corresponding to the white of the mask. The etching technique used, which is well known, consists of coating the base plate with photo-resist, placing the masks over the resist, exposing the areas of the resist defined by the light portions of the mask, removing that photo-resist which has not been exposed, and subjecting the plate to chemical attack. The chemical treatment, effected with suitable reagents, thus produces a chemical etching of the base plate simultaneously on both faces so as to affect the whole of its thickness in the unprotected zones, there being obtained as a result of complete milling of the entire frame of feet as illustrated in FIG. 4*a*. In the end zones left exposed the chemical etching will partially affect the thickness of the plate; with the machines normally used for chemical attack, it is possible to control the time of attack to obtain a reduced thickness of the order of 50 microns and with tolerance of ±5 microns.

The frame obtained in this way, the feet of which are temporarily kept joined together by the strip 15 connecting the limbs 18 (FIG. 4*a*), can thereafter be mounted on the base 1 (FIG. 2) by superimposing the thinned-down ends 16 on the peripheral conductive platforms 9 and effecting direct soldering (without the use of soldering alloys) by known techniques (thermo-compression, ultrasonics, etc.).

Thereafter, the feet can easily be bent, the elbows being still in the thinned-down zone, and the strip 15 is then cut off so as to leave the various feet obtained from the same frame independent. By providing the envelopment of the entire structure in a block of plastic 7, the assembly of feet will reacquire the mechanical strength necessary fo the subsequent mounting of the integrated circuit container.

A consequence of the application of this method will moreover be clear, that is, that if the feet are mounted and soldered so that the zone where metal has been removed faces the hollow of the bend, a number of tenths of a millimeter can be gained per side of the base 1 in the useful size of the container. This constitutes an advantage which can be extremely important in the most advanced applications of high density electronics.

The same results as those described above can also be obtained by adopting other methods, for example by employing a first stage of mechanical cutting or blanking and a following operation of pressing or chemical attack of the ends 16.

Other chemical milling methods of constructing a frame of connecting feet can be used; in these other methods a plate of conductive metal as starting material and a pair of photographic masks of the type described are used.

Two methods, which will now be specified in their successive stages, combine the chemical milling with an electrolytic growth on the base plate of a layer of conductive metal different from that of the plate itself. This growth layer will have a thickness equal to that of the thinned-down zones of the frame of feet, inasmuch as the subsequent operations of chemical attack will result in the production of a frame in which the thinned-down portion of each foot consists solely of electrolytic covering layer. The covering metal must be chosen so that it offers the same advantages as the phosphor bronze of the base plate, both with respect to solderability and with respect to the bending of the feet. The covering metal must also be resistant to the chemical reagents which are used for attacking the base plate, so as to permit dual successive etching by differentiated chemical millings; that is, if chemical attacks of the two types of metallic material are carried out at successive times, each material must be resistant to the chemical reagent which attacks the other. For example, with a phosphor bronze plate, it is possible to employ nickel as the conductive covering metal.

In one process according to the invention, there is provided, as a first stage, the electrolytic growth of a layer of conductive metal on one face of the base plate, the growth is obtained in the form of the first photographic mask (FIG. 5*a*) which defines the geometrical form of the frame. The FIG. 5*a* mask is superimposed on a face of the plate causing the electrolytic growth to take place only in the area of the plate which is defined by the transparent zone of the mask.

In the following stage, etching is carried out by chemical attack of the base plate under the guidance of the second photographic mask (FIG. 5*b*) which is placed over the second face of the base plate and which defines the geometrical form of the frame except the areas of the feet which are to be thinned down; the attack is allowed to pass through the entire thickness of the base plate and ceases only when the electrolytic growth is reached. The ends of the feet (FIG. 4*c*) are therefore thin since they consist solely of the electrolytic growth 3*a* while the other portions of the feet consist of the electrolytic growth plus the base plate 3.

In another process according to the invention, the first stage consists in the electrolytic growth of a layer of conductive metal on an entire face of the base plate. Thereafter, the two photographic masks (FIGS. 5*a* and 5*b*) are applied to the plate, the first mask (FIG. 5*a*) being superimposed on the face of the base plate where the growth takes place and the second mask on the free face of the plate. Etching is then carried out by chemical attack which is differentiated for the base layer and for the growth layer: more precisely, the base plate is etched throughout its thickness under the guidance of the second mask, there being thus obtained the shape of the shanks 18 of the feet with a thickness equal to the metal of the base plate; the electrolytically added layer, on the other hand, is etched throughout its thickness under the guidance of the first mask, there being thus obtained the complete shape of the frame, in which the shanks 18 of the feet are constituted by two layers of metal, while the ends 16 of the feet are constituted solely by the layer of electrolytic metal.

It is obviously possible to modify the particular combination of the processes of electrolytic growth and photolithographic etching. The obtaining of a frame of feet with a thinning-down of the zones intended for attachment to the base of a circuit container is the essence of the invention and, therefore, the particular technique used may vary from those disclosed without departing from the scope of the invention.

What is claimed is:

1. A process for constructing a circuit package comprising the steps:

a. providing a substrate;

b. placing a metallization and an electronic circuit on said substrate, said electronic circuit being connected to said metallization;

c. providing a plurality of legs;

d. affixing said legs to said metallization;

e. bending said legs so as to be substantially perpendicular to said substrate;

the improvement including the steps to be used to provide said plurality of legs, those steps including:

providing a sheet of a first type of metal of uniform thickness from which the plurality of legs are to be formed, electrolytically growing a layer of a second type of metal over one side of said sheet, selectively covering both sides of said sheet with resist to chemical attack, one side, electroplated, being covered so that the form of the legs is protected from chemical attack, the other side being covered so that the form of the legs is protected from chemical attack except for the end portions of the legs, the unprotected end portions being those portions which are to be affixed to the metallization and which are to be bent, subjecting the sheet to two chemical attacks, one of which attacks the first metal but not the second, the other of which attacks the second but not the first.

2. A process for constructing a circuit package comprising the steps:

a. providing a substrate;

b. placing a metallization and an electronic circuit on said substrate, said electronic circuit being connected to said metallization;

c. providing a plurality of legs;

d. affixing said legs to said metallization;

e. bending said legs so as to be substantially perpendicular to said substrate;

the improvement including the steps to be used to provide said plurality of legs, those steps including:

providing a sheet of a first type of metal of uniform thickness from which the plurality of legs are to be formed, masking one side of the sheet so as to leave exposed the form of the legs, electrolytically growing a layer of a second type of metal on the exposed portion, the electrolytically grown layer being in the form of the legs, selectively covering the other side of the sheet so that the form of the legs is protected from chemical attack except for the end portions of the legs, the unprotected end portions being those portions which are to be affixed to said metallization and which are to be bent, subjecting the sheet to a chemical attack, which attack dissolves said first type of metal but not said second type of metal, said attack removing the metal from between the legs and stripping said first metal from said end portions.

3. A process for constructing a circuit package comprising the steps:

a. providing a substrate;

b. placing a metallization and an electronic circuit on said substrate, said electronic circuit being connected to said metallization;

c. providing a plurality of legs;

d. affixing said legs to said metallization;

e. bending said legs so as to be substantially perpendicular to said metallization;

the improvement including the steps to be used to provide said plurality of legs, those steps including:

providing a metal sheet of uniform thickness from which the plurality of legs are to be formed, selectively covering the sheet on both sides with a resistive to chemical attack, one side of said sheet being covered so that the form of the legs is protected from chemical attack, the other side of the sheet being covered so that the form of the legs is protected from chemical attack except for the end portions of the legs, the unprotected end portions being those portions which are to be affixed to said metalliation and which are to be bent, subjecting the sheet to chemical attack thereby removing the metal from between the legs and thining said end portions.

4. A process for constructing a circuit package comprising the steps:

a. providing a substrate;

b. placing a metallization and an electronic circuit on said substrate, said electronic circuit being connected to said metallization;

c. providing a plurality of legs;

d. affixing said legs to said metallization;

e. bending said legs so as to be substantially perpendicular to said metallization;

the improvement including the steps to be used to provide said plurality of legs and to be used to attack those legs to said metallization, those steps including:

providing a metal sheet of uniform thickness from which the plurality of legs are to be formed, selectively covering the sheet on both sides with a resistive to chemical attack, one side of said sheet being covered so that the form of the legs is protected from chemical attack, the other side of the sheet being covered so that the form of the legs is protected from chemical attack except for the end portions of the legs, the unprotected end portions being those portions which are to be affixed to said metallization and which are to be bent, subjecting the sheet to chemical attack thereby removing the metal from between the legs and thining said end portions, the affixing of said end portions to said metallization being effected by direct soldering of said portions to said metallization using no soldering alloys.

* * * * *